United States Patent
Bajaj et al.

(10) Patent No.: US 7,885,965 B2
(45) Date of Patent: Feb. 8, 2011

(54) APPLICATION-RESPONSIVE MARKUP LANGUAGE PARSER

(75) Inventors: Neeraj Bajaj, Rohtak (IN); K. Venugopal Rao, Bangalore (IN)

(73) Assignee: Oracle America, Inc., Redwood City, CA (US)

( * ) Notice: Subject to any disclaimer, the term of this patent is extended or adjusted under 35 U.S.C. 154(b) by 492 days.

(21) Appl. No.: 11/282,436

(22) Filed: Nov. 17, 2005

(65) Prior Publication Data

US 2007/0044081 A1   Feb. 22, 2007

(30) Foreign Application Priority Data

Aug. 17, 2005   (IN)   .......................... 756/KOL/2005

(51) Int. Cl.
  *G06F 7/00*   (2006.01)
  *G06F 17/00*  (2006.01)
  *G06F 17/30*  (2006.01)
(52) U.S. Cl. .................. 707/755; 707/666; 707/694
(58) Field of Classification Search .............. 707/1, 707/100, 666, 694, 755
  See application file for complete search history.

(56) References Cited

U.S. PATENT DOCUMENTS

| | | | | |
|---|---|---|---|---|
| 5,761,676 A | * | 6/1998 | Wood et al. ........................ | 1/1 |
| 5,899,994 A | * | 5/1999 | Mohamed et al. ........... | 707/100 |
| 6,317,755 B1 | * | 11/2001 | Rakers et al. ............... | 707/204 |
| 6,405,217 B1 | * | 6/2002 | Lee ............................. | 707/200 |
| 6,732,124 B1 | * | 5/2004 | Koseki et al. ............... | 707/202 |
| 7,081,882 B2 | * | 7/2006 | Sowden et al. .............. | 345/156 |
| 7,392,256 B2 | * | 6/2008 | Jia et al. ..................... | 707/100 |
| 2002/0012011 A1 | * | 1/2002 | Roytman et al. ............ | 345/736 |
| 2003/0145129 A1 | * | 7/2003 | Nagalkar .................... | 709/321 |
| 2004/0260903 A1 | * | 12/2004 | Navada et al. .............. | 711/165 |

OTHER PUBLICATIONS

T. Fiebig et al., Anatomy of a native XML base management system, The VLDB Journal—The International Journal on Very Large Data Bases, vol. 11 Issue 4, Dec. 2002, Springer-Verlag, pp. 292-314.*

Markus L. Noga et al., Lazy XML processing, DocEng '02: Proceedings of the 2002 ACM symposium on Document engineering, Nov. 2002, ACM, pp. 88-94.*

Martin T. Vechev et al., Write barrier elision for concurrent garbage collectors, ISMM '04: Proceedings of the 4th international symposium on Memory management, Oct. 2004, ACM, pp. 13-24.*

(Continued)

*Primary Examiner*—Charles E Lu
(74) *Attorney, Agent, or Firm*—Polsinelli Shughart PC

(57) ABSTRACT

A markup language parser processes markup language data and provides processed data to an application. A reader is configured to tokenize the markup language data and store resulting tokens in a buffer associated with the reader. A scanner is configured to create string objects based on the tokens and to provide the created string objects to an application. The scanner is further configured to determine a need by the application for the string objects. For each at least some of the string objects created by the scanner, the scanner is configured to selectively create those string objects based on a determination of the need by the application for the string objects.

10 Claims, 3 Drawing Sheets

OTHER PUBLICATIONS

Patrick Th. Eugster et al., On objects and events, ACM SIGPLAN Notices, vol. 36 Issue 11, Nov. 2001, ACM, pp. 254-269.*

R. J. Bayardo et al., An evaluation of binary xml encoding optimizations for fast stream based xml processing, WWW '04: Proceedings of the 13th international conference on World Wide Web, May 2004, ACM, pp. 345-354.*

* cited by examiner

APPLICATION-RESPONSIVE MARKUP LANGUAGE PARSER

TECHNICAL FIELD

The present invention is in the field of markup language parsers that provide processed markup language data to applications and, in particular, relates to a markup language parser that expends processing resources based at least in part on application request.

BACKGROUND

A markup language parser is, in a general sense at least, a program to determine the syntactic structure of a string of symbols in markup language. A markup language (or, perhaps more precisely, markup specification language) describes information (text or data), usually for storage, transmission, or processing by a program. The markup language typically does not specify what should be done with the data.

FIG. 1 illustrates a conventional markup language parser 100 from one simplistic point of view. In broad terms, the parser 100 processes markup language source from a file 106 and provides processed data for use by one or more applications 101. From the simplistic point of view illustrated in FIG. 1, the parser 100 can be considered to include two primary components—a reader 102 and a scanner 104.

The reader 102 reads the contents of the file 106 (including markup language statements which, in the example, are XML) to be processed and stores the contents into a buffer 108, typically of fixed predetermined size. If the size of the file 106 is more than the size of the buffer 108, then the buffer 108 is refreshed with the unread markup language data once the scanner 104 has processed the data that is currently in the buffer 108.

The reader 102 is configured to check for valid markup language characters, tokenize the markup language content (e.g., for XML in one example, to tokenize the markup language content to XMLNames, values and content), and provide the tokens to the scanner 104.

The scanner 104 is configured to process the tokens generated by the reader 102 and to provide string objects and/or values (generically, data 103) to the application 101 based on the tokens. For example, the scanner 104 may operate as a state machine. The string objects and/or values provided to the application 101 by the scanner 104 may be, for example, an XMLName (element name, attribute name), attribute value, element content, etc.

We now briefly discuss circumstances surrounding the conventional passing of data between the reader 102 and the scanner 104. The scanner 104 passes pointer objects to the reader 102. The pointer objects passed by the scanner 104 to the reader 102 are essentially just shells, to be populated by the reader 102. After processing by the reader 102, a pointer object points to a token in the buffer 108, and control is returned to the scanner 104. More particularly, the pointer object indicates an offset into the buffer 108 as well as the length of the token. Then, depending on the type of token being processed, the scanner 104 processes a populated pointer object to either create string objects or to copy data into a buffer 110 in the scanner 104.

It is desired to streamline the operation of the parser.

SUMMARY

A markup language parser processes markup language data and provides processed data to an application. A reader is configured to tokenize the markup language data and store resulting tokens in a buffer associated with the reader. A scanner is configured to create string objects based on the tokens and to provide the created string objects to an application.

The scanner is further configured to determine a need by the application for the string objects. For each at least some of the string objects created by the scanner, the scanner is configured to selectively create those string objects based on a determination of the need by the application for the string objects.

DETAILED DESCRIPTION

It has been realized that, conventionally, the scanner of a markup language parser executes processing to create string objects or copy data into its buffer (depending upon the type of token being processed) even in situations where the application does not ask for or otherwise require a string object and/or data. In accordance with aspects of the invention, at least a portion of processing by the parser, which formerly was carried out "open loop," is now carried out by the parser based on a request or other indication of need by the application, for the result of processing by the parser.

For example, in accordance with one aspect, the string objects are created by the scanner, to provide to the application(s), when requested by the application. In accordance with another aspect, the values are copied from the buffer in the reader, to the scanner for processing and providing to the application(s), based on an internal state of the scanner or the type of token being read.

Figure 2:
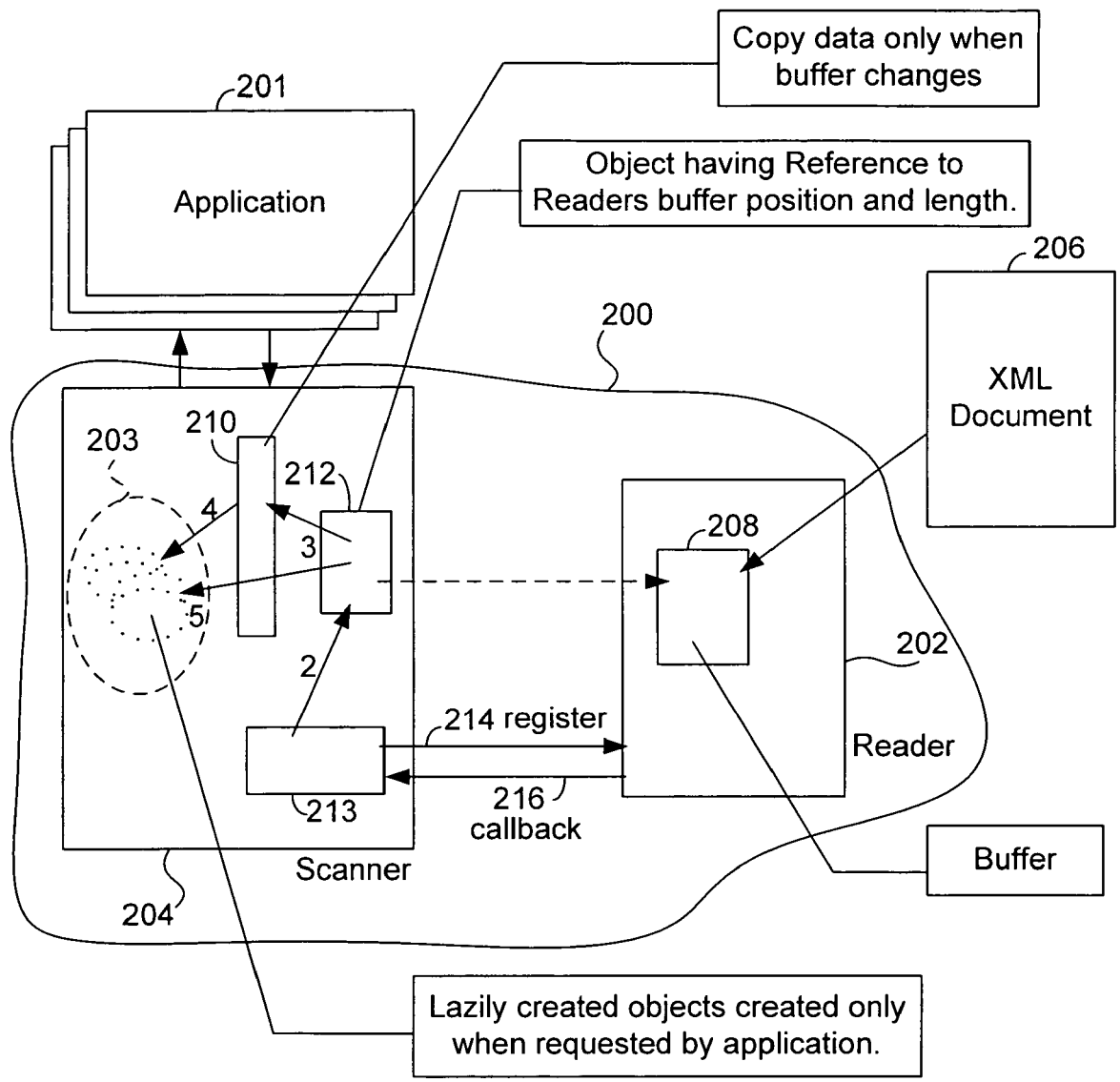
FIG. 2 illustrates a configuration of a markup language parser in which particular operations of the parser are carried out based on an indication from the application of need for the results of the operations.
Figure 3:
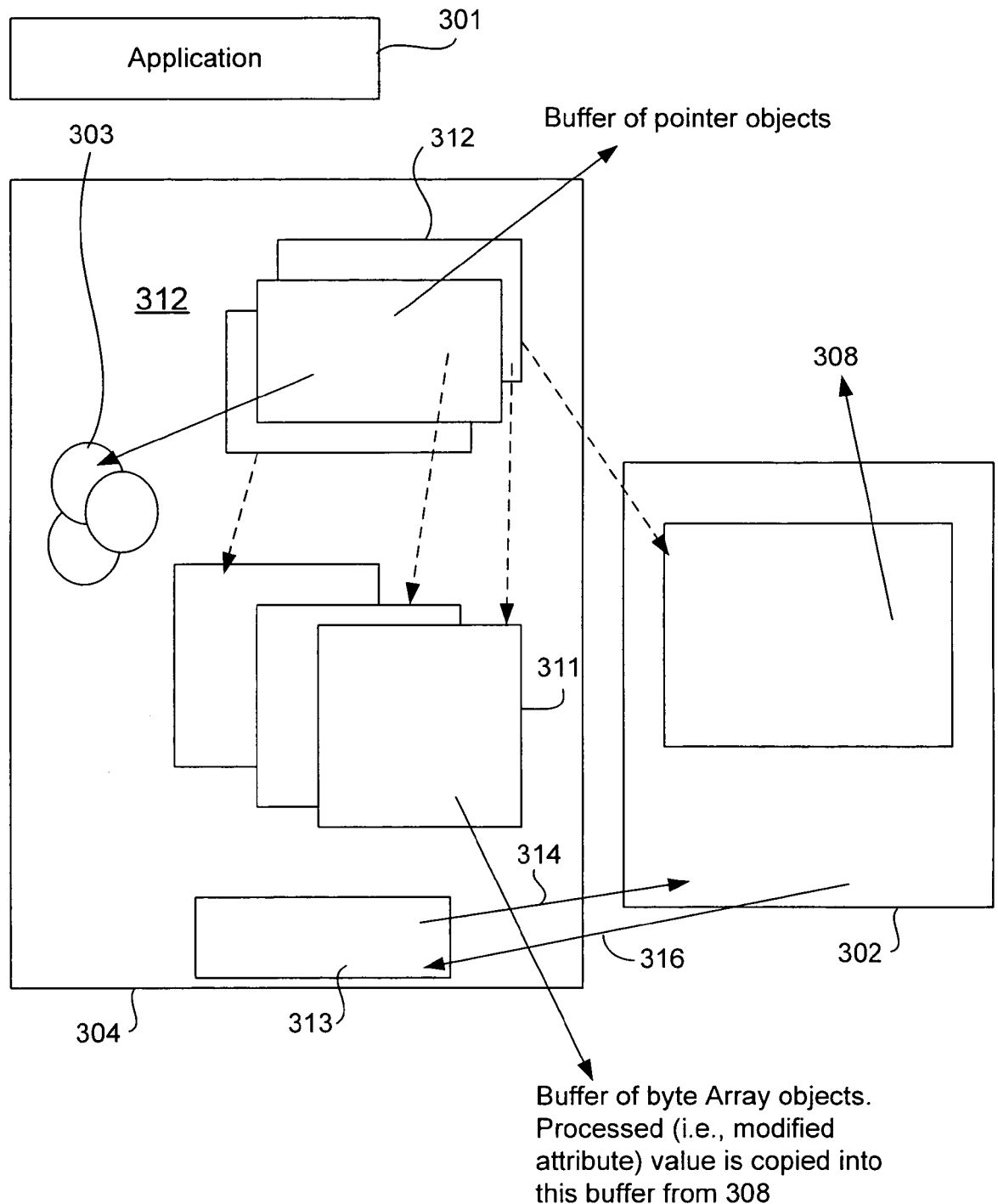
FIG. 3 illustrates an alternate configuration of the FIG. 2 markup language parser.

We now discuss these aspects with reference to embodiments illustrated in FIG. 2 and FIG. 3.

Figure 1:
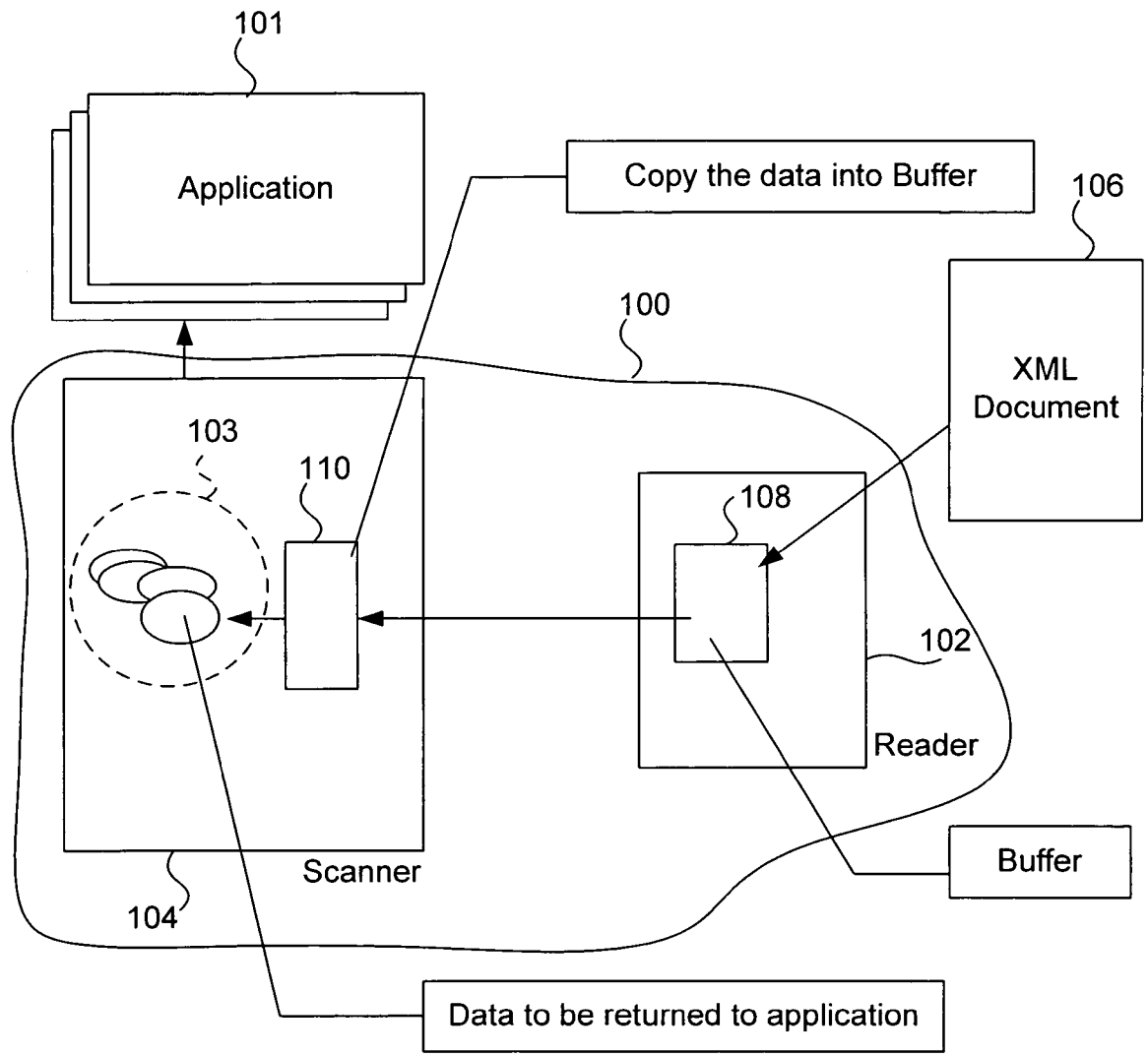
FIG. 1 illustrates a conventional configuration of a markup language parser.

Referring first to FIG. 2, like the conventional parser 100 illustrated in FIG. 1, the FIG. 2 parser 200 includes a reader 202 and a scanner 204. Like the buffer 108 in the FIG. 1 conventional parser 100, the reader 202 includes a buffer 208 into which contents of an XML file 206 are stored. Also like the FIG. 1 example, the reader 202 is configured to check for valid markup language characters in the markup language source 206 and to tokenize the markup language content.

Also like the scanner 104, the scanner 204 maintains a register 212 containing a pointer object that references back to the buffer 208 in the reader 202. For example, the reader 202 may have informed the scanner 204 of offset and length information pertaining to data relevant to a particular token, and the scanner 204 maintains the register 212 containing a pointer object that references back to this data.

Unlike the scanner 104, the scanner 204 typically does not (open loop) copy the pointed-to data from the reader buffer 208 into a buffer associated with the scanner 204 upon completion of processing of the pointer object (i.e., population) by the reader 202. Rather, when string objects are created by the scanner, the data is accessed directly from the reader buffer 208.

To avoid data being overwritten in the reader buffer 208 before it can be accessed by the scanner 204, the scanner 204 is notified when the referenced data in the buffer 208 may be no longer available (e.g., will be overwritten in the buffer 208). At this point, if it is determined by the scanner 204 that the referenced data will not be needed, then the referenced data need never be copied out of the buffer 208.

In one example, a "listener" mechanism is used to notify the scanner 204 when the referenced data in the buffer 208 may be no longer available. That is, the arrow 214 in FIG. 2 emanating from listener logic 213 indicates specification by the scanner 204 of a listener object to the reader 202. When the referenced data in the buffer 208 may be no longer available (e.g., when the reader 202 is about to load new data from the markup language document 206 into the buffer 208), the reader 202 gives a callback (arrow 216) to the listener logic 213 of the scanner 204.

At this point, the scanner 204 determines whether the referenced data may be needed, based on the internal state of the scanner 204 or the type of token that is being/was read. For example, if the state of the scanner 204 is such that the referenced data has already been processed or is past the state in which the referenced data would have been processed, then the referenced data is no longer needed. If the referenced data in the buffer 208 may be needed, then the referenced data is copied from the buffer 208 of the reader 202 into a buffer 210 of the scanner 204.

Furthermore, whereas in the FIG. 1 example, objects 103 are created without regard for need by the application(s) 101, in accordance with another aspect, the objects 203 (FIG. 2) are created when the application(s) 201 asks for data from the parser. Thus, for example, when an application 201 asks for data from the parser, the objects 203 are created using data from the buffer 208 (of the reader 202) or from the buffer 210 (of the scanner 204) as appropriate.

FIG. 3 illustrates an example where the scanner 304 maintains a pool 312 of pointer objects. This is particularly useful where, for example, a token may have multiple attributes in the buffer 308 of the reader 302. Each pointer object references, for example, a different one of the attributes in the buffer 308. The processing with respect to the pointer object references, and the data pointed to by the pointer objects, may be similar to that discussed above with reference to FIG. 2. As with the FIG. 2 example, at least some of the string objects 303 are created only when a need is indicated by the application. It is noted that, in the FIG. 3 example, a buffer like the buffer 210 of the scanner 204, in the FIG. 2 example, is not shown.

Put another way, in general, there may be two types of buffers, and there are two pools, one for each type of buffer. Both types of buffers are used to store attribute values. For example, in the following string:

attrNameOne="Value1"

the buffers may be used to store "Value1".

With regard to the two types of buffers, a first type of buffer is used when the attribute is simple and all that is needed to get the value is the starting and ending offsets to the buffer. This is the type of buffer 212 illustrated in FIG. 2. That is, each pointer object in the buffer 212 is just a pointer to a set of characters in the reader buffer 208.

As discussed above, the first type of pointers are converted to string values and read into the scanner 204 in two scenarios. The first scenario is that an attribute is read by the application and the corresponding attribute value is requested by the application. The second scenario is that a callback 216 is received, indicating the buffer 208 is about to be written over. In the second scenario, the attribute value is copied into the buffer 210.

A second type of buffer (illustrated in the simplified view in FIG. 3) is used when attribute values are not simple, and more processing is applied before giving an attribute value to the application. The processing of the attribute value is applied when the scanner 304 is processing the buffer 308 in the reader (again, either due to the attribute being requested by the application 301 or due to a callback 316 being received by listener logic 313, corresponding to a listener object specified by the scanner 304 to the reader 302 indicated by arrow 314, indicating that the buffer 308 in the reader is about to be written over. The processed attribute values are stored in a byte array 311 in the scanner.

In this case, there is a one-to-one correspondence between the first type of object (in array 312) and the second type of object (in byte array 311). That is, each of the first type of object (in array 312) points to the buffer 308 in the reader 302. In this case, when a copy is made, the type one object points to a type 2 object (in byte array 311) in the scanner 304 that holds the actual values.

As described, a scanner of a markup language parser can omit execution of processing to create string objects or copy data into its buffer (depending upon the type of token being processed) in situations where the application does not ask for or otherwise require a string object and/or data.

What is claimed is:

1. A method of operating a markup language parser to process markup language data and to provide processed data to an application, comprising:

in a reader implemented by utilizing a processing unit to execute a first set of instructions stored in a machine-readable storage media, integrally including a reader buffer, tokenizing the markup language data and storing resulting tokens in the reader buffer, wherein the markup language parser includes at least the reader;

in a scanner implemented by utilizing the processing unit to execute a second set of instructions stored in the machine-readable storage media, selectively creating string objects based on the tokens by accessing data directly from the reader buffer when the scanner determines a need by an application for the string objects, and providing the created string objects to the application, wherein the markup language parser includes at least the scanner;

in the scanner, when the scanner receives a notification that tokens are to be overwritten in the reader buffer, determining whether a state of the scanner indicates that the tokens are unneeded;

in the scanner, copying the tokens from the reader buffer to a scanner buffer, integrally included in the scanner, when the scanner receives the notification that the tokens are to be overwritten in the reader buffer unless the scanner determined that the state of the scanner indicates that the tokens are unneeded; and in the scanner, selectively creating at least one additional string object based on the tokens by accessing data from the scanner buffer when the scanner determines a need by the application for the at least one additional string object.

2. The method of claim 1, wherein said copying tokens from the reader buffer to a scanner buffer when the scanner receives a notification that the tokens are to be overwritten in the reader buffer comprises:

processing a signal received by the scanner, the signal associated specifically with a token, for each of a selected plurality of tokens stored in the reader buffer, and receiving the token into the scanner from the reader, based on the signal.

3. The method of claim 2, further comprising:

for each of the selected plurality of tokens, holding a pointer pointing to the respective token of the selected plurality of tokens, wherein the scanner is configured to hold the pointer; and receiving each token into the scanner from the reader based on processing the pointer to that token.

4. The method of claim 3, further comprising:

providing the signal associated specifically with a token stored in the reader buffer, based on a condition that the token is to be overwritten in the reader buffer, wherein the reader is configured to provide the signal.

5. The method of claim 4, further comprising:

registering the pointers to the tokens in the reader, wherein the scanner is configured to register the pointers; and providing a signal for a particular token stored in the reader buffer, wherein the reader is configured to provide the signal, based on a condition that the token is to be overwritten in the reader buffer, only for tokens whose pointer is registered with the reader by the scanner.

6. The method of claim 5, further comprising:

registering pointers to the tokens in the reader buffer including, for each pointer, registering with the reader a listener object for that pointer, wherein the scanner is configured to register the pointers to the tokens in the reader buffer; and further wherein the signal the reader is configured to provide is a callback to the scanner from the reader.

7. The method of claim 3, further comprising:

receiving a token into the scanner from the reader including the scanner being configured to receive the token in the scanner from the reader and the scanner being configured to receive the token into the scanner buffer; and the scanner is configured to receive a token into the scanner from the reader buffer based on an indication of a need by the application for a string object, based on the token.

8. The method of claim 4, further comprising:

receiving a token into the scanner from the reader buffer based on an indication that the token is to be overwritten in the reader buffer, wherein the scanner is configured to receive the token into the scanner.

9. The method of claim 8, further comprising:

maintaining pointers from the scanner to the tokens in the reader buffer.

10. The method of claim 9, further comprising:

registering the maintained pointers with the reader, using the scanner to register the maintained pointers; and notifying the scanner when a token in the reader buffer is to be overwritten in the reader buffer, the token corresponding to a registered maintained pointer, wherein the reader notifies the scanner.

* * * * *